United States Patent [19]

Gilbert et al.

[11] 3,998,573
[45] Dec. 21, 1976

[54] MANUFACTURE OF FRICTION ELEMENTS

[75] Inventors: Richard H. Gilbert, Ramsey, N.J.;
Arvon M. Griffith, Valley Cottage, N.Y.

[73] Assignee: Abex Corporation, Columbus, Ohio

[22] Filed: Oct. 17, 1975

[21] Appl. No.: 623,375

Related U.S. Application Data

[63] Continuation of Ser. No. 449,834, March 11, 1974, abandoned, which is a continuation-in-part of Ser. No. 218,313, Jan. 17, 1972, abandoned.

[52] U.S. Cl. .............................. 425/117; 425/195; 425/420; 425/812; 264/112
[51] Int. Cl.² ..................................... B29C 27/30
[58] Field of Search .......... 264/122, 126, 319, 333, 264/DIG. 78, 112; 425/812, 117, 127, 420, 195, 501

[56] References Cited
UNITED STATES PATENTS

| | | | |
|---|---|---|---|
| 208,097 | 9/1878 | House | 425/812 X |
| 1,048,616 | 12/1912 | Wheeler | 425/812 X |
| 2,026,940 | 1/1936 | Hendryx | 264/DIG. 78 |
| 2,573,141 | 10/1951 | Heinrich | 425/812 X |
| 2,900,664 | 8/1959 | Hampel et al. | 425/420 X |
| 3,008,235 | 11/1961 | Royer et al. | 425/812 X |

Primary Examiner—Robert L. Spicer, Jr.
Attorney, Agent, or Firm—Kinzer, Plyer, Dorn & McEachran

[57] ABSTRACT

Friction elements, composed of fillers including at least five percent by weight of asbestos, bonded by a thermosetting resin, are first produced as pre-forms of final density by merely stamping the dry mixture in a die cavity. The problem of delamination is overcome by making provision for passages in one of the mold cavity members, said passages leading from the mold cavity to the ambient atmosphere. Sustained operation at high speed is made possible by screening the ends of the passages which open into the die cavity. The stamped article is removed from the die cavity and subjected to a time-temperature curing cycle to cure or thermally harden the bonding resin.

3 Claims, 6 Drawing Figures

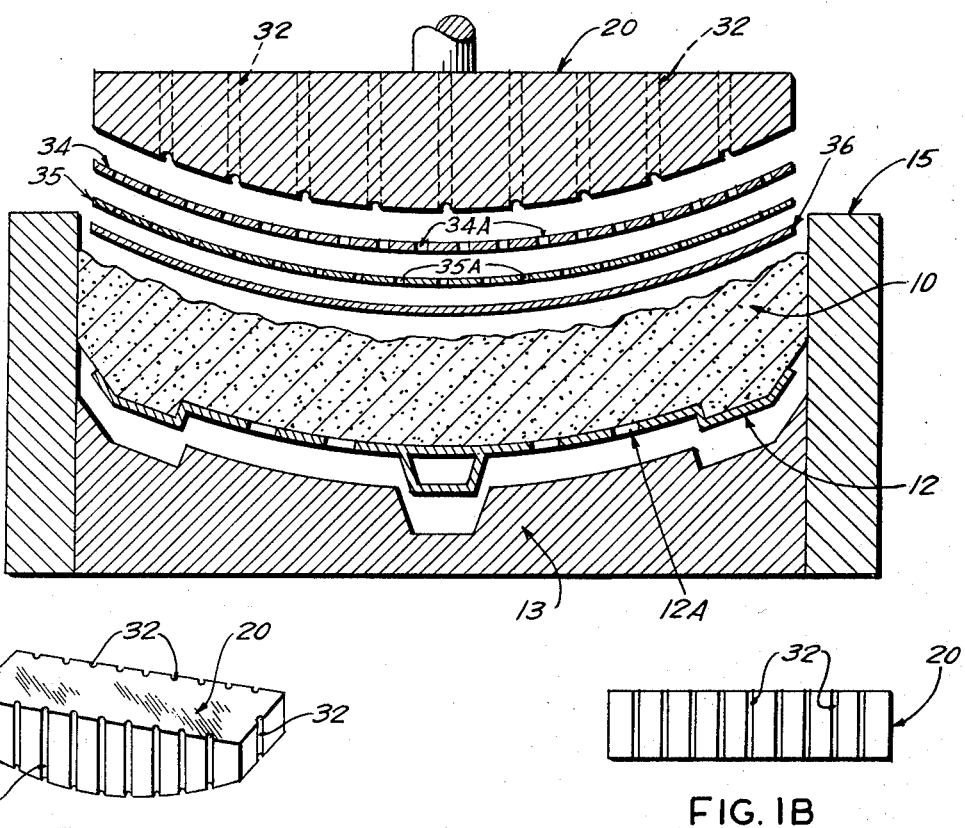
FIG. 1
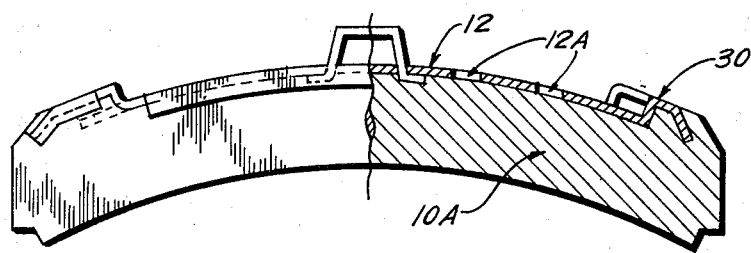
FIG. 1A
FIG. 1B
FIG. 2
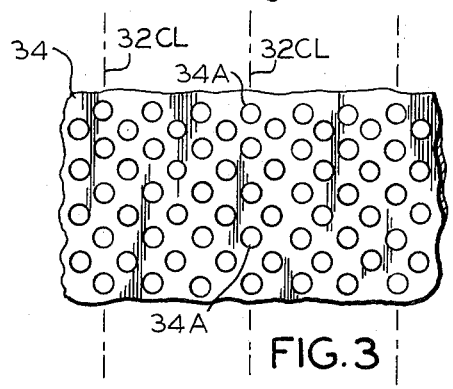
FIG. 3
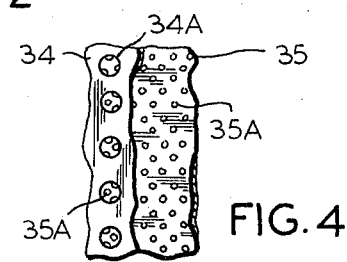
FIG. 4

MANUFACTURE OF FRICTION ELEMENTS

This is a continuation, of application Ser. No. 449,834, filed Mar. 11, 1974, now abandoned; and which is a continuation-in-part of U.S. application Ser. No. 218,313, Jan. 17, 1972 now abandoned.

This invention relates to the production of friction elements such as railroad brake shoes, pads for disc brakes, automotive brake linings and the like.

In Griffith U.S. Pat. No. 3,492,262 there is disclosed a composition of matter for producing low friction railroad brake shoes, characterized by cast iron particles up to 30 percent by weight, graphite particles 20–55 percent by weight, asbestos fibers 8–17 percent by weight, phenol formaldehyde thermosetting bonding resin 14–24 percent by weight and up to 30 percent by weight of miscellaneous friction modifiers such as barytes, alumina, coke and so on. A relatively high amount of asbestos fibers, as much as 35–50 percent by weight, is characteristic of automotive brake linings, within the purview of the present invention.

A conventional compression molding technique is disclosed in the aforesaid Griffith patent in that after a homogeneous mixture of the ingredients has been attained a mold or die cavity may be filled therewith and subjected to a preliminary cure for several hours at high temperature and under a significant amount of pressure. This procedure is responsible for both densifying the mixture and partially curing the thermosetting resin. Afterwards the partially cured, molded product is then subjected to a final cure involving a prolonged heat cycle of 350° C or upwards for 10 hours or more.

In Gilbert U.S. Pat. No. 3,334,163 (original application filed in 1962) it is disclosed that high costs of producing friction elements by compression molding, involving the simultaneous application of high pressure and high temperature could be avoided by stamping an essentially solvent-free so-called dry mixture, which is to say that by first stamping the substantially dry mixture to its final density at room temperature, thermal cure of the resin may be subsequently accomplished outside the high pressure mold without resort to the simultaneous application of high pressure. In theory, the Gilbert principle should work but in actual practice a cohesive body maintaining final density was not always attained; to the contrary delamination was encountered, in spite of the fact that the binder was tacky as will be explained below.

Under the present invention, dry friction mixtures, devoid of solvent or any other purposely added liquid, and being very fluffy and of low bulk density may be stamped to final density at room temperature, in a single rapid advance of the plunger (less than half a minute and down to seventeen seconds or less) and then cured outside the mold without the application of high pressure provided one of the die elements is formed with passages leading to the ambient atmosphere and provided the passages are effectively screened. Some pressure may be applied during the cure, of the order of 20 psi, to prevent warpage and/or to assure a good bond of the friction material to a metal backing member which supports the friction material as hereinafter disclosed.

It is therefore the primary object of the present invention to stamp to final density a dry friction mixture, containing a relatively high amount of asbestos, in such a fashion as to avoid delamination and to accomplish this by providing a path for the rapid egress of air trapped in the mixture being stamped at exceptionally high pressures in such a fashion that repeated stampings may be made at high speed without obstructing the path. In this connection, it is to be observed that others working this art have deprecated the idea of using exceptionally high pressure to produce friction elements from an essentially dry mixture or so-called "furnish": see U.S. Pat. No. 3,084,130.

Other and further objects of the present invention will be apparent from the following description and claims and are illustrated in the accompanying drawing which, by way of illustration, shows a preferred embodiment of the present invention and the principle thereof and what we now consider to be the best mode in which we have contemplated applying that principle. Other embodiments of the invention embodying the same or equivalent principles may be used and structural changes may be made as desired by those skilled in the art without departing from the present invention.

In the drawings:

FIG. 1 is a sectional view, somewhat schematic, of a press, together with certain screen elements used in the practice of the invention;

FIG. 1A is a perspective view of the plunger;

FIG. 1B is a bottom plan view of the plunger;

FIG. 2 is a sectional view of a railroad brake shoe, such as may be produced under the present invention; and FIGS. 3 and 4 are detail views, drawn to scale, showing the dimensional relationship of certain passages and openings.

Preliminary to and since the filing of the original application for U.S. Pat. No. 3,334,163 on Apr. 19, 1962, and prior thereto over a span of nearly ten years, we have addressed ourselves to the problem of how to produce quality friction elements from an essentially dry mixture, containing a thermosetting resin (potential) binder in an essentially dry (powder) state, without applying heat and pressure simultaneously to effect cure of the resin. Concurrent application of heat and pressure has long been the standard practice.

According to the disclosure in U.S. Pat. No. 3,334,163 it was sought to solve the problem by subjecting the friction mixture containing the resin binder, to intense internal working within a mixing chamber, so intensive that internal friction would melt and advance the resin to a somewhat plastic, tacky state but far short of its hardened, infusible state. The resultant mixture was still essentially solvent or vehicle-free, but with the resin sufficiently soft that a measured amount of the mixture incorporated in a molding cavity could be pressed to the final density desired for the friction element, maintaining its integrity and density when removed from the molding cavity in spite of the fact that the binder was not cured. Consequently, the stamped friction material could be transferred to an oven and maintained at an elevated temperature sufficiently long to transform the thermosetting resin from the soft "B" stage to its hardened, infusible "C" state. Thus the dry mixture was stamped without added heat, and the stamped body was cured without pressure, except as may be necessary to avoid warpage. However, as noted above, delimination or spalling may occur, characterizing a rejected product and a diminished production rate.

There are several confining factors which limit the possible solution. First, we want to separate the application of pressure and heat as a simultaneous event for curing the resin binder in the production of friction elements, rendering these successive events, while nonetheless achieving a quality product which retains the essential characteristics (friction coefficient, wear resistance, impact strength, etc.) of one produced by the simultaneous event of the older method. Secondly, whatever fits the foregoing criteria must be justified (cost-wise) in terms of a production rate; or stated somewhat differently, once it is determined that a friction element, having the performance of one produced by the older method, can be produced by first stamping to final density, without heat, and then curing to final hardness without pressure (except as may be necessary to avoid warpage or promote bonding to a metal back) any mode of increasing the production rate in such a procedure justifies a lower cost for the consumer or justifies a higher price for a product modified by addition of certain ingredients for superior or specified performance. Third, the procedure must accommodate a variant-density mixture containing an appreciable asbestos content and entraining up to 80% air. A mixture of this character is set forth below under Example 1, giving the preferred mixture for a railroad brake shoe and the possible range.

We have developed a process which satisfies these limiting criteria, and as described in detail below, but first we shall address ourselves to the composition preferred for the production of a railroad brake shoe. Those skilled in the art may easily adapt this composition to the production of automotive brake linings, disc brake pads or even clutch facings, produced from a similar dry mixture, in which event more asbestos will be used and perhaps brass chips rather than particles of cast iron.

The precise constituency and proportioning of the mixture to be stamped under the present invention will vary dependent upon the intended use in terms of whether the resultant friction element is in the form of an automotive brake lining, a railroad brake shoe, clutch disc and so on. Thus the friction and wear characteristics, depending upon use, will vary widely, and the properties of friction and wear are determined by adjustment or variation in the components constituting the mixture being pressed; but in any event the present invention will be practiced in terms of an asbestos content of at least five percent or more by weight (even up to 40 percent) and a binder in the form of a thermosetting resin. The exact nature of the resin is not important, since it may be modified many ways as to hardness value, but is preferably a Novolak or two-step heat hardenable phenol formaldehyde resin, although a one-step heat hardenable phenol formaldehyde resin may be used, or a mixture of the two. In the instance of a railroad brake shoe, the following example may prevail;

The Novolak is heat settable (cure by hexamethylene tetramine, herein "hexa") to a thermosetting state. The dry ingredients of Example 1 are blended homogeneously, and a measured amount thereof, 10, FIG. 1, is placed on top of a steel back 12, the latter being complementally related to a fixture 13 constituting the bottom wall of a die member 15. A heat activatable bond may be applied to the adjacent face of the back 12 as an aid to bonding the friction mixture 10 thereto; for the most part a physical interlock between the friction mixture 10 and the back 12 is attained by means of openings 12A in the back into which the mixture is forced by extrusion during the stamping operation.

Cast iron is not always necessary, especially in the instance of disc pads for the disc brakes of cars on rapid transit rail systems; thus, brass chips may be used with or without cast iron particles.

After the measured amount of the friction mixture has been thus juxtaposed on the back 12 supported within the die member, the punch or plunger member 20 is presented as the other member which defines the mold cavity, compressing the dry mixture 10 until it assumes the geometry of desired brake shoe 30, FIG. 2. The applied, final pressure is about 16 tons per square inch (TSI) released immediately when attained, compressing the mixture to its final density which is about 85 percent of theoretical density, sometimes up to 90%.

The die plunger is then retracted, and the united assembly, FIG. 2, is removed from the die cavity, characterizing a railroad brake shoe including the back 12 and the densified friction block 10A. It will be appreciated that what is shown in FIG. 2 is not a limiting factor in terms of geometry.

The consolidated assembly, FIG. 2, is then transferred to a heat treating furnace where it is baked for about ten hours during which time the temperature is raised from about 150° to about 230° C. Mild pressure of the order of 20 psi is applied for reasons explained above. The upper temperature is then maintained for about six additional hours, resulting in a complete cure of the phenol formaldehyde resin binder. The phenolic binder of Example 1 is a Novolak, containing about six percent of an accelerator such as "hexa" to hasten the cure. However, a one-step heat hardenable phenol formaldehyde resin may be used as well, or in combination with a Novolak as noted. In any event, the major and essential constituent of the binder is a known heat hardenable phenol formaldehyde resin, as heretofore used in the manufacture of friction elements. This resin may be modified independently or in combination with rubber and cashew as disclosed in Spokes and Keller U.S. Pat. No. 3,673,276.

Under and in accordance with the present invention rapid and repeated stamping operations are made possible in part by slotting one of the mold cavity members Example 1

| Component | Range (% by Weight) | Preferred % by Weight |
| --- | --- | --- |
| Phenol formaldehyde resin (Novolak | 14–24 | 24 |
| Particles of cast iron (+120 mesh) | 0–30 | 17.2 |
| Graphite particles (−60, +325 mesh) | 20–55 | 21 |
| Asbestos fibers (Grade 4K) | 8–17 | 8.8 |
| Friction modifiers (barytes or alumina, 95% −325 mesh; coke, −20 mesh) | 0–30 | 29 | to allow egress of air trapped in the fluffy, dry mixture undergoing compression. Preferably the path of egress is afforded by forming slots or grooves 32, FIG. 1A, in the side and end walls of the plunger member 20, the slotting being continued across the bottom face or wall of the plunger, as shown in FIG. 1B. The slots may be: 1/16 to 3/32 inch deep, 1/32 inch to 3/32 inch wide and 3/4 inch center-to-center spacing for both railroad brake shoes and railroad disc pads. Consequently, air trapped in the mixture has an escape route to the ambient atmosphere, and in order that this escape route will not be burdened or obstructed, thereby allowing the high speed compression stroke when stamping as noted above, we interpose a combination of screen elements between the mixture to be pressed and the bottom wall of the plunger member. The screen elements include a first perforate metal sheet 34, uppermost in the die cavity, to be engaged by the curved bottom wall of the plunger 20. The screen element 34 is provided with relatively large openings 34A. The screen element 34 is sixteen gauge steel having circular openings of 1/16 inch diameter, in rows offset by a 5/32 inch stagger; total open area, twenty-three per cent. These openings 34A are so oriented as to collectively bridge substantially the passages 32 having center lines 32 CL, FIG. 3, while allowing free passage of air through the holes 34A and into the passages 32. It is difficult to predict or determine the precise bridging relationship in the instance of a railroad brake shoe because the curved face of the shoe (replicated in the plunger) is a section of a compound curve but the projected plane is shown in FIG. 3. In any event the dimensioning and hardness of the metal is such that substantially all the slots 32 communicate with several holes 34A and without the metal of plate 34 extruding into the passages in slots 32 under the exceptionally high stamping pressures used.

The next screen element is also a sheet metal member 35, interposed between the screen element 34 and a sheet of paper 36 which is placed on top of the dry mixture 10. The sheet metal screen 35 is stainless steel formed with openings 35A of smaller size compared to the openings 34A, and of course the paper sheet 36 is itself porous. The screen 35 is preferably 0.008 inch thick having openings 35A of 0.020 inch diameter, 23 percent open, so that each opening 34A, FIG. 4, spans several of the openings 35A. The two sheet metal members may be fastened to the lower face of the plunger.

We have found that fabric or cloth is not an acceptable substitute for the paper. First of all, fabric or cloth (e.g. canvas duck) increases cost, and furthermore we have found that such material crumbles under the applied pressure. Our experience also was that passages 32 in the plunger, formed to present a smaller diameter at the working face and a progressively larger diameter outwardly thereof, is not a satisfactory substitute for the metal screens having openings 34A and 35A of different diameter. We also tried leather. Not only is the leather expensive, but we also found that it crushes under the pressures involved.

The sheet of paper, having inherent very small openings through which air may pass, precludes the friction mixture 10 from clogging or obstructing the openings in the overlying metal screen 35 but of course allows air to pass therethrough. The paper is preferably nothing more than a sheet of kraft paper; paper toweling may be used and glossy paper as well.

The interposed metal screen 35 prevents bits of paper from plugging the passages in the uppermost screen member 34 which itself has relatively large openings to accommodate the progressing wave of compressed air squeezed from the mix 10.

The consolidated assembly taken from the die cavity after retraction of the plunger is then transferred to a heat treating furnace where the conditions already noted are applied. In most instances the sheet of paper sticks to the consolidated body 10A taken from the die cavity, but this makes no difference at all since it is incinerated during cure. The upper temperature is maintained for about six additional hours, resulting in a complete cure of the phenol formaldehyde resin binder. The phenolic binder of Example 1 is a Novolak, containing about six percent of an accelerator such as "hexa" to hasten the cure. However, a one-step heat hardenable phenol formaldehyde resin may be used as well, or in combination with a Novolak as already noted.

It will be seen from the foregoing that under the present invention the molding cavity for accommodating a dry-fluffy friction mix is, at the time of mold cavity closure, bounded by the walls of the die member as 15 and the related complemental plunger member as 20. The shape of the molding cavity in conjunction with the stroke of the plunger member will compress the dry mix to conform to the geometry of the friction element desired. One of the die members is provided with a plurality of passages leading from the molding cavity to the ambient atmosphere, and these passages, at the ends thereof which open into the molding cavity, are covered by perforate screen means collectively allowing egress of trapped air during the process of compressing the mixture. Afterwards, the compressed body at final density is subjected to a time-temperature cure cycle to harden the resin binder. This procedure enables quality friction elements to be produced at high speed without simultaneous application of heat and pressure. The combination of screen elements makes this possible, for we found that one of the screen elements, 34 or 35 alone, quickly plugs after two or three strokes at most and also a single screen extrudes into the slots of the plunger. The paper liner is wasted with each stroke of the plunger and in this regard there is not satisfactory substitute.

The magnitude of compressions involved in the course of stamping the dry mixture can be realized by observing that for the production of a railroad brake shoe the bulk density of the fluffy, dry mixture to be stamped is only 0.35 – 0.40 grams per cc., compressed to a final density of 1.90 – 2.20 grams per cc., using a stamping pressure in the range of 16 – 20 tons per square inch. For automotive brake linings the starting bulk density is about 0.24 – 0.29 grams per cc. with a final or finished density of 1.6 – 2.2 grams per cc. when using a stamping pressure of 16 – 20 TSI.

We claim:
1. Mold apparatus for pressing vehicle friction elements from an essentially dry mixture of fillers, at room temperature, comprising at least 5% by weight of asbestos fibers and a thermosetting resin to form a self-supporting body suitable for subsequent heat-curing outside the mold, while using a mold cavity bounded by a die member and a plunger member which when mated conform generally to the geometry of the friction element, in which at least one of the members has incorporated therein a plurality of passages leading from the molding cavity to the ambient atmosphere, characterized in that the mold for pressing the mixture is pro- vided with a screen means comprising three elements, the first of which consists of a sheet of expendable paper, in contact with the mixture to be compressed, and the second and third elements of which consist of perforate sheet metal elements which are interposed between the sheet of paper and the member of the mold having the passages, with the sheet metal element contacting the sheet of paper having openings which are smaller than the openings of the other sheet metal member contacting the member of the mold equipped with the passages.

2. Mold apparatus according to claim 1, further characterized in that the passages are formed in the plunger.

3. Mold apparatus according to claim 2, further characterized in that substantially all of the passages in the plunger each bridge several openings in the sheet metal element in contact with the plunger, whilst substantially all of the latter openings each span several openings in the other sheet metal element.

* * * * *